United States Patent [19]

Morizumi

[11] Patent Number: 5,444,512
[45] Date of Patent: Aug. 22, 1995

[54] CAMERA VIBRATION CORRECTION APPARATUS

[75] Inventor: Masaaki Morizumi, Omiya, Japan

[73] Assignee: Fuji Photo Optical Co., Ltd., Omiya, Japan

[21] Appl. No.: 321,452

[22] Filed: Oct. 11, 1994

Related U.S. Application Data

[63] Continuation of Ser. No. 27,761, Mar. 8, 1993, abandoned.

[30] Foreign Application Priority Data

Mar. 16, 1992 [JP] Japan .................... 4-058321
Mar. 16, 1992 [JP] Japan .................... 4-058322

[51] Int. Cl.$^6$ .................................. G03B 7/08
[52] U.S. Cl. ........................ 354/430; 354/70; 354/195.12
[58] Field of Search ............ 354/70, 76, 195.1, 202, 354/430; 348/208; 359/554–557

[56] References Cited

U.S. PATENT DOCUMENTS 4,864,339  9/1989  Gross et al. .................... 354/202
5,172,276 12/1992  Ueyama et al. ................. 359/813
5,243,462  9/1993  Kobayashi et al. .............. 359/557

FOREIGN PATENT DOCUMENTS 63-49729  3/1988  Japan .

Primary Examiner—M. L. Gellner
Assistant Examiner—J. K. Han
Attorney, Agent, or Firm—Oliff & Berridge

[57] ABSTRACT

A camera vibration correction apparatus for use with a zooming camera. The correction apparatus includes: a group of correcting lenses for correcting blurring of an image; a camera vibration detector that detects magnitude and directions of a camera vibration; a CPU for computing a correcting movement value on the basis of the detected vibration; driving motors for moving the correcting lenses on the basis of the correcting movement value; and a zoom detector that senses movement values of a group of movable lenses within the group of photographic lenses. The CPU activates the driving motors, allowing correction for vibration, when the zoom detector senses that the camera lenses are in a telescopic region and deactivate the driving motors, preventing correction, when the zoom detector senses that the camera lenses are in a wide angle region. Preferably, if the angle of view becomes more than 10°, the correction apparatus is activated, otherwise it is not. The correcting lenses are mounted for rocking movement by a novel mounting structure that is simple and provides stable support.

8 Claims, 7 Drawing Sheets

PRIOR ART

CAMERA VIBRATION CORRECTION APPARATUS

This is a Continuation of application Ser. No. 08/027,761 filed Mar. 8, 1993, now abandoned.

BACKGROUND OF THE INVENTION

1. Field of the Invention

This invention relates to a camera vibration correction apparatus, and more particularly to a camera vibration correction apparatus, which is capable of preventing blurring of an image caused by camera vibration.

2. Description of the Related Art

There have heretofore been made various proposals regarding the camera vibration correction apparatus for preventing blurring of an image on an image-formation surface, at which the focus is made, said blurring of an image being caused by the camera vibration and the like. This camera vibration correction apparatus is constituted by the following elements.

That is, a group of correcting lenses for correcting blurring of the image on the image-formation surface, at which the focus is made, is positioned in front or at the back of a group of photographic lenses, and a driving motor for moving the group of correcting lenses is connected to this group of correcting lenses. Connected to the driving motor is a CPU which controls the lens driving of the driving motor. Furthermore, connected to the CPU is an acceleration sensor for detecting the magnitude and directions of the camera vibration.

The CPU computes a correcting moving value to be given to the group of correcting lenses on the basis of information obtained from the acceleration sensor, and the information indicating the correcting movement value thus computed is output to the driving motor. Then, the driving motor moves the group of correcting lenses by a value negating a movement of the image caused by the camera vibration on the basis of the above-described information.

FIG. 7 shows a conventional camera vibration correction apparatus. A group of correcting lenses 1 is held by a lens frame 1A which is supported by a main body 5 of a camera through plate springs 2 and 2 secured to the right and left sides of the lens frame 1A, a ring 3 and plate springs 4 and 4 secured to the top and bottom sides of the ring 3. Secured to the lens frame 1A are a screw 5A and a motor 6A for rotating the screw. This motor 6A is driven, whereby the plate springs 2 and 2 are flexed to the right and left, so that the lens frame 1A can be moved to the right and left with respect to an optical axis P. Furthermore, the motor 6B for rotating the screw 5B, which is secured to the ring 3, is driven, whereby the plate springs 4 and 4 are flexed vertically, so that the lens frame 1A can be moved vertically with respect to the optical axis P.

The above-described motors 6A and 6B are driven on the basis of the information from the CPU, which is computed on the basis of camera vibration information obtained from an acceleration sensor, (not shown), so that the group correcting lenses 1 is vertically and laterally moved by a value negating the movement of the image caused by the camera vibration.

FIG. 8 shows another conventional camera vibration correction apparatus. The lens frame 1A holding the correcting optical system lens 1 is held in a tubular member 8 through four plate springs 7. Furthermore, secured onto the outer peripheral surface of the lens frame 1A are forward end portions of movement control bars 9A and 9B, whereby the lens frame 1A can be laterally moved with respect to the optical axis P by rocking the movement control bars 9A laterally. Moreover the lens frame 1A can be vertically moved with respect to the optical axis P by rocking the movement control bars 9B vertically.

The above-described movement control bars 9A and 9B are driven on the basis of the information of the camera vibration obtained from an acceleration sensor similar to the screw motors 6A and 6B, so that the group of correcting lenses 1 can be moved vertically and laterally by a value negating the movement of the image caused by the camera vibration.

However, in the conventional camera vibration correction apparatus, the camera vibration correcting function is operated and controlled in all of the regions from the wide angle side to the telescopic side during the zooming of the group of photographic lenses, so that disadvantages are present. First, the camera vibration correction apparatus is not correct, and second, the life of the battery of the camera vibration correction apparatus is shortened.

Furthermore, in the conventional camera vibration correction apparatus shown in FIGS. 7 and 8, the lens frame is supported by the plate springs, whereby the lens frame cannot be supported stably, and further, the motors or the movement control bars for moving the plate springs or the lens frame are provided separately of each other, thereby presenting the disadvantage of complicated construction.

SUMMARY OF THE INVENTION

The present invention has been developed to eliminate the above-described disadvantages and has as its object the provision of a camera vibration correction apparatus, wherein the camera correction apparatus can be prevented from being incorrect, the life of a battery can be extended, the construction thereof can be rendered simple and the lens frame member can be supported stably.

To achieve the above-described object, the present invention is characterized in that the camera vibration correction apparatus comprises: a group of correcting lenses for correcting blurring of an image on an image-formation surface, at which the focus is made; a camera vibration detecting means for detecting the magnitude and directions of the vibrations; a computing means for computing a correcting movement value to be given to the group of correcting lenses on the basis of information obtained from the camera vibration detecting means; a driving means for moving the group of correcting optical lenses on the basis of information obtained from the computing means; and a zoom detecting means for detecting zoom information for sensing movement values of a movable lens group, on-off of said driving means being controlled on the basis of the zoom information obtained from the zoom detecting means.

The present invention recognizes that the region requiring the camera vibration correcting function by the camera vibration correction apparatus is the region on the telescopic side, and, even if the camera vibration correction apparatus is operated in the region on the wide angle side, the camera vibration correcting effect is not notable, whereby on-off of the driving means for moving the group of correcting lenses is adapted to be controlled on the basis of the zoom information obtained from the zoom detecting means secured to a group of photographic lenses.

To state specifically, when the group of photographic lenses having an angle of view 6° on the telescopic side an angle of view 60° on the wide angle side are used, if the angle of view comes to be less than 10° during the zooming of the photographic lens group, then an "on signal" is transmitted to the driving means from the detecting means, while, if the angle of view exceeds 10°, then an "off signal" is transmitted. That is, the camera vibration correction apparatus is operated in the region on the telescopic side having the angle of view less than 10°.

To achieve the above-described object, the present invention is characterized in that the camera vibration correction apparatus comprises: a lens frame holding a group of correcting lenses for correcting the camera vibration and formed in the circumferential direction on the outer peripheral surface thereof with a groove; 1st, 2nd and 3rd driving members pivotably secured to the main body of camera and urging the groove provided on the lens frame equidistantly with the forward end portions thereof to thereby hold a lens frame member; and 1st and 2nd driving means connected to the 1st and 2nd driving members in a manner to be able to transmit the driving forces, and pivoting the 1st and 2nd driving members on the basis of information obtained from the camera vibration detecting means to move the lens frame, so that the group of correcting lenses is moved by a value negating a movement of an image caused by the camera vibration.

According to the present invention, the forward end portions of the 1st, 2nd and 3rd driving members are urged into the groove formed in the lens frame to hold the lens frame, and, when the camera vibration is detected by the camera vibration detecting means, the 1st and 2nd driving means are operated on the basis of the above-described camera vibration to rotate the 1st and 2nd driving members, whereby the lens frame is moved by the biasing force of the 3rd driving member or moved against the basing force, so that the correcting optical system lens is moved by the value negating the movement of the image caused by the camera vibration.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of the camera vibration correction apparatus according to the present invention with reference to the accompanying drawings.

Figure 1:
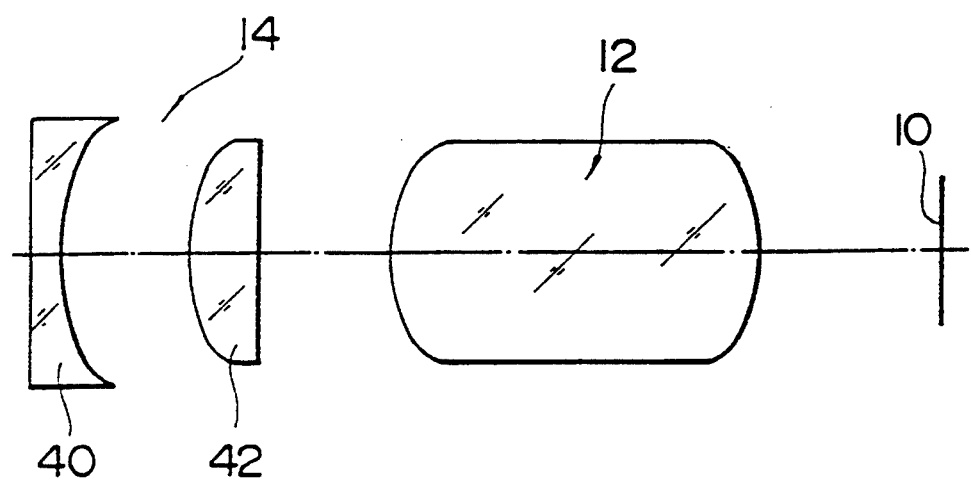
FIG. 1 is an explanatory view showing the mounted position of the camera vibration correction apparatus according to a first embodiment of the present invention.

FIG. 1 is an arrangement view of a group of camera lenses, to which the camera vibration correction apparatus according to the first embodiment of the present invention is applied. A group 12 of photographic lenses are arranged in front of an image-formation surface 10, at which the focus is made, and a group 14 of a camera vibration correcting lenses are arranged in front of the group 12 of photographic lenses, as shown in the described order.

Figure 2:
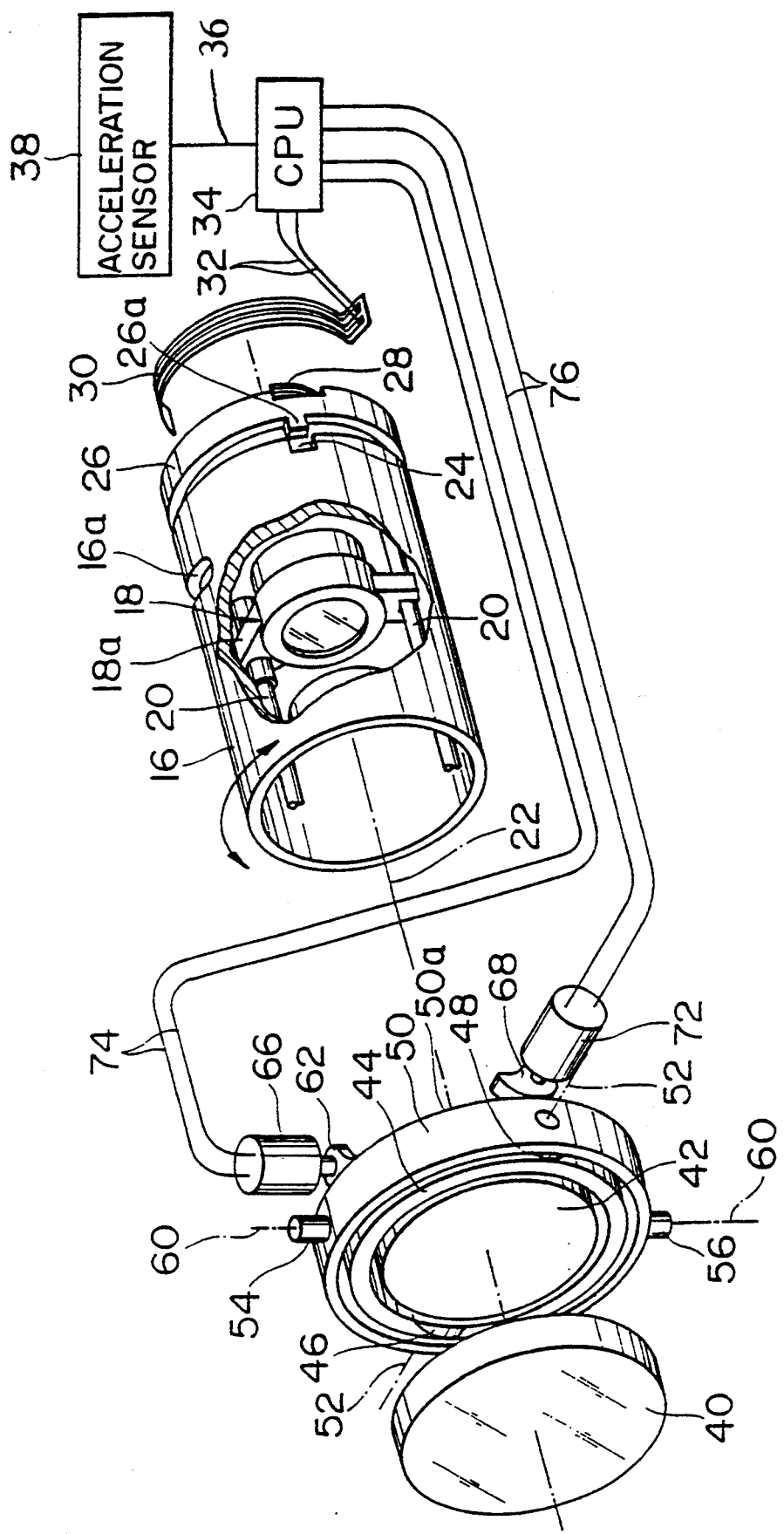
FIG. 2 is a perspective view showing the camera vibration correction apparatus according to the first embodiment of the present invention.

As shown in FIG. 2, in a zoom cam tube 16 of the group 12 of photographic lenses, a plurality of groups 18 of zoom lenses are inserted in a state of being supported by a pair of guide bars 20 and 20, and a pin, not shown, formed on a frame member 18a of the group 18 of zoom lenses is coupled into a cam groove 16a formed in the zoom cam tube 16. Accordingly, when the zoom cam tube 16 is rotated, the groups 18 of zoom lenses move forwardly or rearwardly of an optical axis 22 along the cam groove 16a, thereby performing the zooming of an image. Incidentally, in this embodiment, for example, the group 12 of photographic lenses have 6° angle of view on telescopic side and 60° angle of view on a wide angle side during zooming.

A recess portion 24 is formed at the rear end portion of the zoom cam tube 16, and a convex portion 26a of a zoom driving ring 26 is engaged with this recess portion 24. With this arrangement, the zoom driving ring 26 is rotated integrally with the zoom cam tube 16. A brush 28 formed of a electrically conductive material is secured to the rear end portion of the zoom driving ring 26. The brush 28 comes into slidable contact with a semi-circularly arc-shaped resistance plate 30 secured to a main body of the camera, whereby the brush 28 slides on the resistance plate 30 due to the rotation of the driving ring 26.

The resistance plate 30 is connected to a CPU 34 through cables 32, whereby a resistance value is varied by the sliding of the brush 28, i.e., zoom information of the group 12 of photographic lenses is output as the resistance value into the CPU 34. Connected to the CPU 34 is an acceleration sensor 38 through a cable 36, whereby the magnitude and directions of the camera vibration, which are detected by the acceleration sensor 38 are output into the CPU 34.

As shown in FIGS. 1 and 2, the group 14 of the camera vibration correcting lenses include a group 40 of front lenses, a group of correcting lenses 42 for correcting the blurring of the image on the image-formation surface 10, at which the focus is made, and so forth.

As shown in FIG. 2, the group of correcting lenses 42 is held by a lens holding frame 44. This lens holding frame 44 is pivotably supported by a ring 50 through a pair of pins 46 and 48 implanted in the horizontal direction on the outer peripheral surface of the lens holding frame 44. With this arrangement, the lens holding frame 44 is supported by the ring 50, while pivoting about a horizontal shaft 52.

Figure 3:
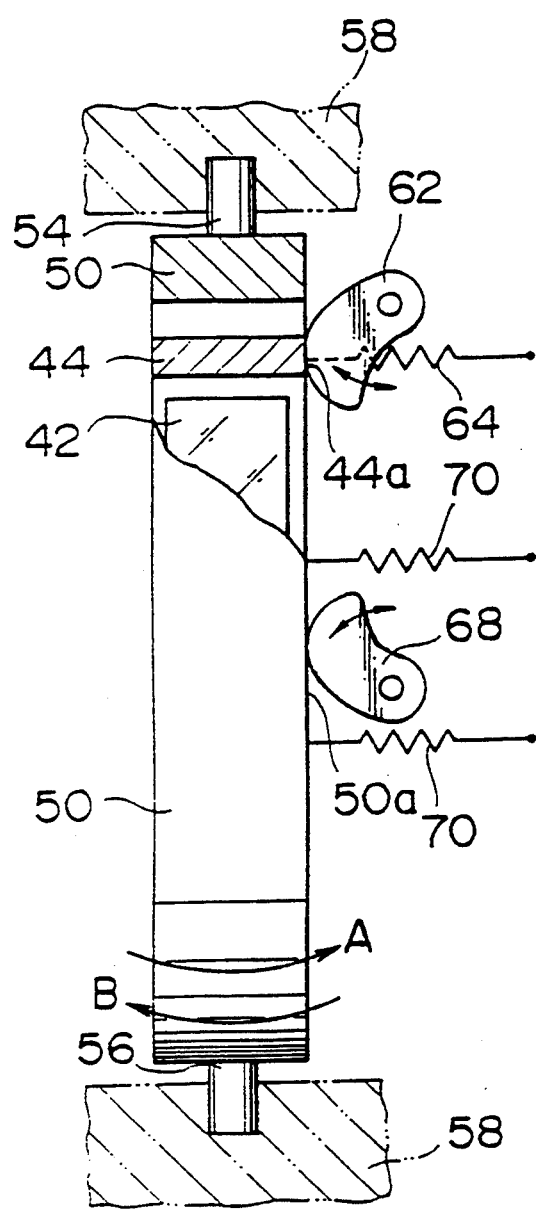
FIG. 3 is a partial sectional side view showing the vibration mechanism applied to the camera vibration correction apparatus according to the first embodiment of the present invention.

Furthermore, the ring 50 is supported by the main body 58 of the camera indicated by the two-dot chain lines in FIG. 3 through a pair of pins 54 and 56 implanted in the vertical direction on the outer peripheral surface of the ring 50, while pivoting about the vertical axis. With this arrangement, the ring 50 is supported by the main body 58 of camera, while pivoting about the vertical axis 60 (Refer to FIG. 2).

Furthermore, as shown in FIG. 3, a cam 62 is abutted against a right end face 44a of the lens holding frame 44. This cam 62 is urged and abutted against the lens holding frame 44 through a biasing force of a spring 64, one end portion of which is secured to the right end portion 44a of the lens holding frame 44. The cam 62 can be rotated by a driving force from a driving motor 66 shown in FIG. 2.

As shown in FIG. 3, a cam 68 is abutted against a right end face 50a of the ring 50. This cam 68 is urged and abutted against the ring 50 through biasing forces of a pair of springs 70 and 70, ends of which are secured to the right end face 50a of the ring 50. The cam 68 can be rotated by a driving force from a driving motor 72 shown in FIG. 2.

The driving motors 66 and 72 are connected to the CPU 34 through cables 74 and 76.

The method of controlling the camera vibration correction apparatus with the above-described arrangement by the CPU 34 will hereunder be described.

Upon sensing that the angle of view comes to be less than 10° from zoom information input during the zooming of the group 12 of photographic lenses, the CPU 34 transmits an on signal for driving the lenses to the driving motors 66 and 72 through the cables 74 and 76, while, upon sensing that the angle of view exceeds 10°, the CPU 34 transmits an off signal for driving the lenses to the driving motors 66 and 72.

That is, when the acceleration sensor 38 detects the camera vibration during the photographing or recording within a range of less than 10° of the angle of view, the CPU 34 operates the driving motors 66 and 72 on the bias of the information of the camera vibration to rotate the cam 62 and 68, whereby the group of correcting lenses 42 is moved by a value negating a movement of an image caused by the camera vibration. To state specifically, when the cam 62 of the driving motor 66 is rotated from a position shown in FIG. 3 in the clockwise direction in the drawing, the lens holding frame 44 is pushed by the cam 62 to be pivoted about the horizontal shaft 52 (Refer to FIG. 2) in the clockwise direction in the drawing. Furthermore, when the cam 62 is rotated from a position shown in FIG. 3 in the counterclockwise direction in the drawing, the lens holding frame 44 is pivoted about the horizontal shaft 52 in the clockwise direction through the biasing force of the spring 64.

On the other hand, when the cam 68 of the driving motor 72 is rotated from a position shown in FIG. 3 in the clockwise direction in the drawing, the ring 50 is pivoted about the vertical axis 60 (Refer to FIG. 2) in a direction indicated by an arrow A through the biasing forces of the springs 70 and 70. Furthermore, when the cam 68 is rotated from a position shown in FIG. 3 in the counter-clockwise direction, the ring 50 is pushed by the cam 68 to be pivoted about the vertical axis 60 in a direction indicated by an arrow B in FIG. 3. When the driving motors 66 and 72 are normally or reversely rotated at the same time, the group of correcting lenses 42 is moved by the value negating the movement of the image caused by the camera vibration and directions therefore, because the lens holding frame 44 can be pivoted in a desirable direction.

Accordingly, this embodiment is based on operating the camera vibration correction apparatus is only a region on the telescopic side, whereby operation of the camera vibration correction apparatus is limited to this region requiring the camera vibration correction function, so that, as compared with the conventional camera vibration correction apparatus, which operates and controls over the whole region, the probability of occurrence of malfunction of the camera vibration correction apparatus can be reduced and the life of the battery of the camera vibration correction apparatus can be extended.

Incidentally, in this embodiment, when the angle of view comes to be less than 10°, an "on signal" for driving the lens is transmitted to the driving motors 66 and 72, however, the angle of view should not necessarily be limited to this, and a change may be made by the types of photographic lenses.

Furthermore, the structure of the group 14 of the vibration isolating optical system lenses should not necessarily be limited to this embodiment, and other structures may be adopted.

Figure 4:
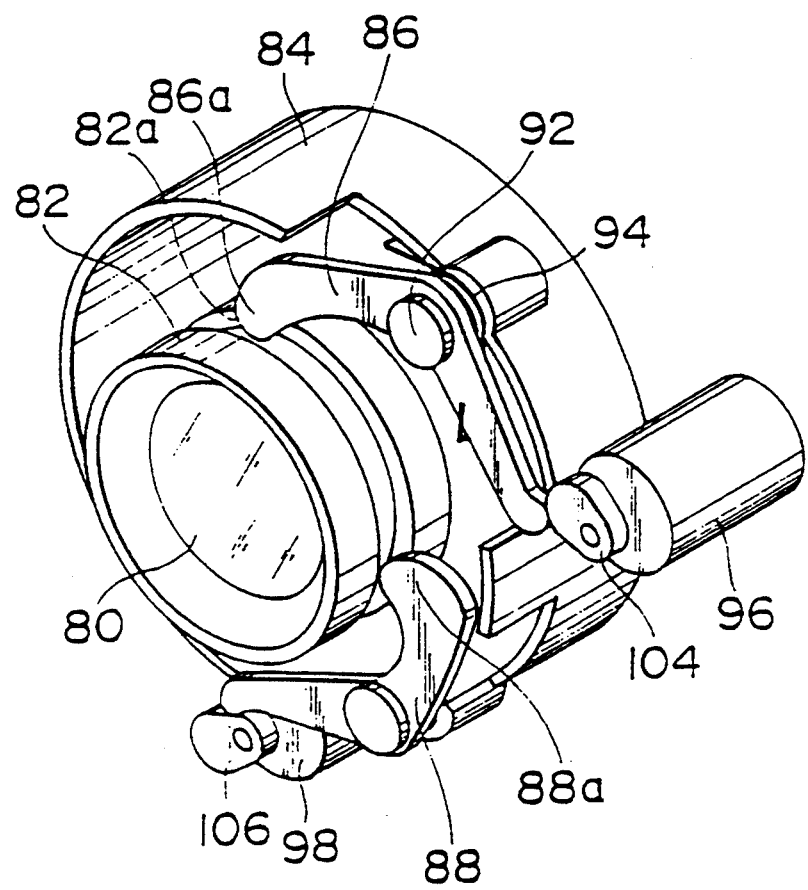
FIG. 4 is a perspective view showing the camera vibration correction apparatus according to a second embodiment of the present invention.
Figure 5:
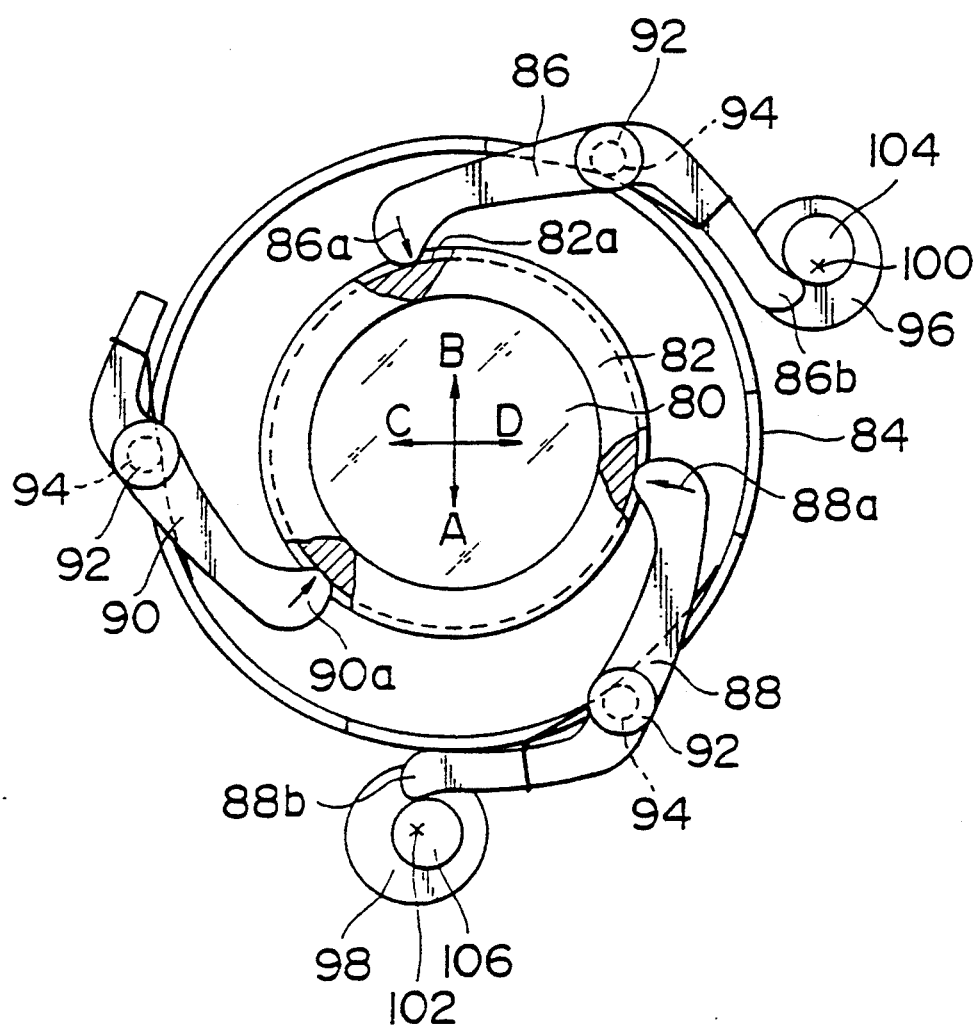
FIG. 5 is a front view showing the camera vibration correction apparatus according to the second embodiment of the present invention.
Figure 6:
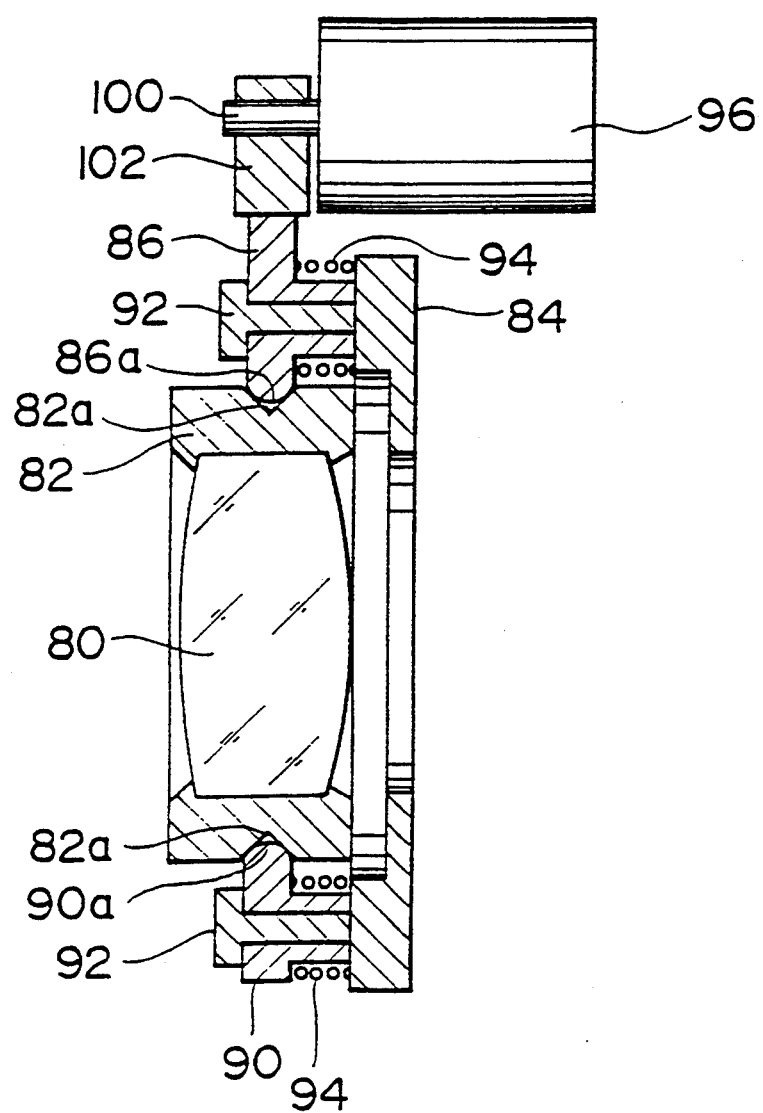
FIG. 6 is a sectional view in FIG. 5.
Figure 7:
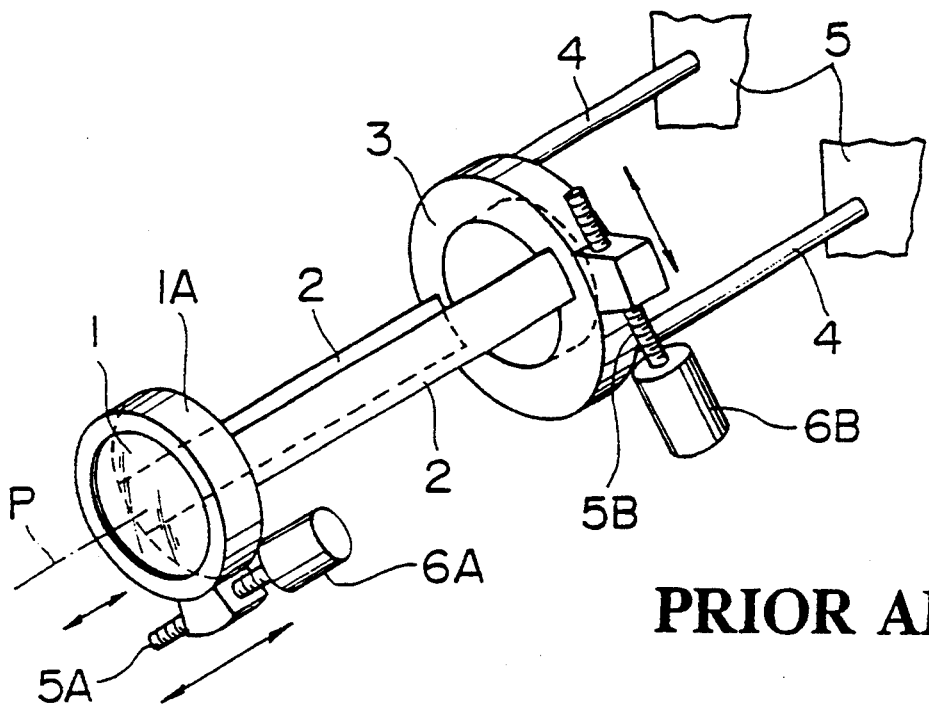
FIG. 7 is a perspective view showing a conventional camera vibration correction apparatus.
Figure 8:
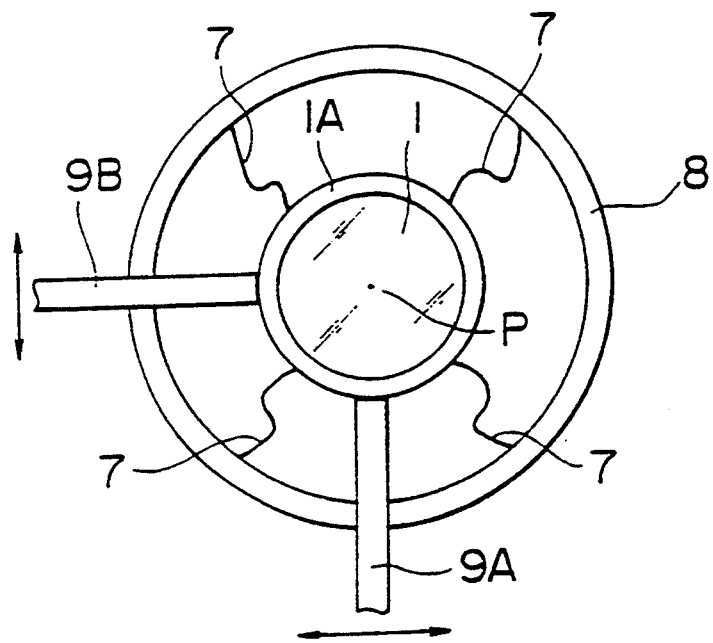
FIG. 8 is a front view showing another conventional camera vibration correction apparatus.

FIG. 4 is the perspective view showing the second embodiment of the camera vibration correction apparatus according to the present invention, FIG. 5 is a front view thereof and FIG. 6 is a sectional view thereof.

According to FIG. 4, a group of correcting lenses 80 for correcting the camera vibration is held in a tubular lens frame 82 which is supported by three driving levers 86, 88 and 90 shown in FIG. 5 at a central portion of a tubular member 84 secured to the main body of a camera, not shown.

The driving levers 86, 88 and 90 are arranged equidistantly on the tubular member 84, and pivotably supported on the tubular member 84, while using shafts 92, 92 and 92 secured to the substantially central portions thereof as the fulcrums. Furthermore, the driving levers 86, 88 and 90 are biased by springs 94, 94 and 94 which are mounted on the shafts 92, 92 and 92 in the counterclockwise direction in FIG. 5, respectively, and spherical forward end portions 86a, 88a and 90a of the driving levers 86, 88 and 90 are urged and abutted against a groove 82a formed in the circumferential direction on the outer peripheral surface of the lens frame 82. With this arrangement, the lens frame 82 is held at the central portion of the tubular body 84, while being supported by the driving levers 86, 88 and 90 at three points.

Abutted against end portions 86b and 88b of the driving levers 86 and 88 are cams 104 and 106 secured to rotary shafts 100 and 102 of driving motors 96 and 98. Accordingly, the driving motors 96 and 98 are operated to rotate the cams 104 and 106, so that the driving levers 86 and 88 can be pivoted while using the shafts 94 and 94 as the fulcrums.

The driving motors 96 and 98 are connected to the CPU; (not shown) this CPU computes a correcting movement value for moving the group of correcting lenses 80 by a value negating the movement of the image caused by the camera vibration on the basis of the camera vibration information obtained from the acceleration sensor, (not shown) provided on the main body of camera, and outputs the information thus computed to the driving motors 96 and 98.

Action of the camera vibration correction apparatus with the above-described arrangement according to the second embodiment will hereunder be described.

When the camera vibration is detected by the acceleration sensor, the CPU operates the driving motors 96 and 98 on the basis of the camera vibration information, whereby the driving levers 86 and 88 are pivoted, so that the group of correcting lenses 80 is moved by the value negating the movement of the image caused by the camera vibration.

For example, when the group of correcting lenses 80 is to be moved downwardly in FIG. 5 (direction A in the drawing) to negate the movement of the image caused by the camera vibration, only the driving motor 96 is normally rotated and the driving lever 86 is pivoted in the counter-clockwise direction in FIG. 5. With this operation, the lens frame 82 is guided by the forward end portion 88a of the fixed driving lever 88 and moved to the left and downwardly against the biasing force of the driving lever 90.

Furthermore, when the group of correcting lenses 80 is to be moved upwardly (direction B in the drawing), only the movable driving motor 96 is reversely rotated to pivot the driving lever 86 in the clockwise direction against the biasing force of the spring 94. With this operation, the lens frame 82 is guided by the forward end portion 88a of the driving lever 88 and moved rightwardly and upwardly through the biasing force of the driving lever 90.

On the other hand, when the group of correcting lenses 80 is to be moved leftwardly (direction C in the drawing), only the driving motor 98 is normally rotated, whereby the driving lever 88 is pivoted in the counter-clockwise direction. With this operation, the lens frame 82 is guided by the forward end portion 86a of the fixed driving lever 86 and moved to the left and upwardly in the drawing against the biasing force of the driving lever 90.

Furthermore, when the group of correcting lenses 80 is to be moved to the right (direction D in the drawing), only the driving motor 98 is reversely rotated, whereby the driving lever 88 is pivoted in the clockwise direction against the biasing force of the spring 94. With this operation, the lens frame 82 is guided by the forward end portion 86a of the driving lever 86 and moved to the right and downwardly in the drawing through the biasing force of the driving lever 90.

Further, when the driving motors 96 and 98 are normally or reversely rotated at the same time, the group of correcting lenses 80 can be moved by the vibration negating the movement of the image caused by the camera vibration and the directions thereof, because the lens frame 82 can be moved in plane in a desirable direction.

Accordingly, in the second embodiment, the lens frame 82 is supported by the three driving levers 86, 88 and 90 in the tubular member 84, so that the lens frame can be supported stably as compared with the conventional camera vibration correction apparatus, in which the lens frame is held by the sheet springs.

Furthermore, the driving levers 86 and 88 are support members for the lens frame 82 and are pivoted to move the lens frame 82, so that the camera vibration correction apparatus can be simplified in construction as compared with the conventional camera vibration correction apparatus.

As has been described hereinabove, in the camera vibration correction apparatus according to the first embodiment of the present invention, on-off of the driving means for moving the group of correcting lenses is controlled on the basis of the zoom information obtained from the zoom detecting means secured to the group of photographic lenses, and the region for the operation of the camera vibration correction apparatus is limited to the region requiring the camera vibration correcting function, so that the probability of occurrence of malfunction of the camera vibration correction apparatus can be reduced and the life of the battery of the camera vibration correction apparatus can be extended.

Furthermore, in the camera vibration correction apparatus according to the second embodiment of the present invention, the forward end portions of the 1st, 2nd and 3rd driving members are urged and abutted against the groove formed in the lens frame to support the lens frame, so that the lens frame can be supported stably as compared with the conventional camera vibration correction apparatus, in which the lens frame is supported by the sheet springs.

Further, the 1st and 2nd driving members are support members for the lens frame and are rotated by the 1st and 2nd driving means to move the group of correcting lenses, so that the camera vibration correction apparatus can be simplified in construction.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A camera vibration correction apparatus, comprising:
   at least one photographic lens for focusing an image on an image-formation surface;
   at least one correcting lens for correcting blurring of the image;
   a camera vibration detector;
   a lens frame member holding said at least one correcting lens, said frame member being formed in a circumferential direction of an outer peripheral surface of said lens frame member with a groove;
   first, second and third driving members pivotably secured to a main body of the camera and having forward end portions thereof urged and abutted against the groove of said lens frame member and equidistantly spaced around the outer peripheral surface to hold said lens frame member; and
   first and second driving means connected to said first and second driving members for pivoting said first and second driving members on the basis of information from said camera vibration detector to move said lens frame member, so that said at least one correcting lens is moved by a value negating a movement of the image caused by the camera vibration.

2. The camera vibration correction apparatus as set forth in claim 1, wherein said first and second driving means are driven and controlled on the basis of information from a computing means for computing a correcting movement value on the basis of information from said camera vibration detector.

3. The camera vibration correction apparatus as set forth in claim 1, wherein said first, second and third driving members are formed of levers, respectively, the substantially central portions of the respective levers are pivotably secured to a main body of the camera, and forward end portions of the respective levers are urged and abutted against the groove in the lens frame member for holding said at least one correcting lens by springs provided on the main body of the camera.

4. The camera vibration correction apparatus according to claim 1, wherein each of said first and second driving means includes a cam.

5. The camera vibration correction apparatus according to claim 1, wherein said first, second and third driving members are attached to and pivotally rotatable about shafts, said shafts being affixed to said main body of the camera.

6. The camera vibration correction apparatus according to claim 5, wherein springs are located on said shafts, said springs acting on said first, second and third driving members to urge said first, second and third driving members into contact with said groove.

7. The camera vibration correction apparatus according to claim 1, further comprising a zoom detecting means for sensing movement values of at least one movable lens within said at least one photographic lens between a wide angle region and a telescopic region, wherein said first and second driving means are activated to allow correction caused by vibration when the sensed movement values indicate said at least one movable lens is in said telescopic region and said first and second driving means are deactivated to prevent correction when the sensed movement values indicate said at least one movable lens is in said wide angle region.

8. The camera vibration correction apparatus of claim 1 wherein said first and second driving means are simultaneously actuatable to move said lens frame member along a plane in any direction.

* * * * *